(12) United States Patent
Vilela et al.

(10) Patent No.: US 9,417,946 B2
(45) Date of Patent: *Aug. 16, 2016

(54) METHOD AND SYSTEM FOR FAULT CONTAINMENT

(71) Applicant: Infineon Technologies AG, Neubiberg (DE)

(72) Inventors: Antonio Vilela, Mering (DE); Andre Roger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1 day.

This patent is subject to a terminal disclaimer.

(21) Appl. No.: 14/337,699

(22) Filed: Jul. 22, 2014

(65) Prior Publication Data

US 2014/0337670 A1 Nov. 13, 2014

Related U.S. Application Data

(63) Continuation of application No. 13/417,382, filed on Mar. 12, 2012, now Pat. No. 8,819,485.

(51) Int. Cl.
*G06F 11/07* (2006.01)
*G06F 11/16* (2006.01)

(52) U.S. Cl.
CPC ........ *G06F 11/0763* (2013.01); *G06F 11/1654* (2013.01); *G06F 11/1695* (2013.01); *G06F 11/1641* (2013.01)

(58) Field of Classification Search
CPC ............ G06F 11/1641; G06F 11/0763; G06F 11/1695; G06F 11/1654; G06F 11/1687
See application file for complete search history.

(56) References Cited

U.S. PATENT DOCUMENTS

| 4,635,223 | A | 1/1987 | Boone et al. |
| 5,452,443 | A | 9/1995 | Oyamada et al. |
| 5,748,873 | A | 5/1998 | Ohguro et al. |
| 6,519,710 | B1 | 2/2003 | Saunders et al. |
| 6,615,366 | B1 | 9/2003 | Grochowski et al. |
| 8,019,861 | B2 | 9/2011 | Ginzton |
| 8,275,977 | B2 * | 9/2012 | Moyer ................. G06F 11/3632 712/227 |
| 8,819,485 | B2 * | 8/2014 | Vilela ................. G06F 11/0763 714/11 |
| 2003/0229836 | A1 | 12/2003 | Matsumoto |
| 2007/0283061 | A1 | 12/2007 | Mueller et al. |
| 2008/0244305 | A1 | 10/2008 | Troppmann et al. |
| 2009/0177866 | A1 * | 7/2009 | Choate ................. G06F 11/1641 712/200 |
| 2013/0179720 | A1 * | 7/2013 | Bellows ................. G06F 11/366 713/401 |

FOREIGN PATENT DOCUMENTS

| CN | 1206147 A | 1/1999 |
| CN | 1248748 A | 3/2000 |
| EP | 0358955 A2 | 3/1990 |
| GB | 2317032 A | 3/1998 |

OTHER PUBLICATIONS

Non-Final Office Action dated Dec. 19, 2013 for U.S. Appl. No. 13/417,382.
Notice of Allowance dated May 1, 2014 for U.S. Appl. No. 13/417,382.
European Search Report dated Aug. 14, 2013 for European application No. 13001212.3.

* cited by examiner

*Primary Examiner* — Nadeem Iqbal

(74) *Attorney, Agent, or Firm* — Eschweiler & Associates, LLC

(57) ABSTRACT

Embodiments relate to systems and methods for error containment in a system comprising detecting an error by processing an input signal by multiple processing units, and delaying at least one output signal of a processing unit to enable, in case an error has been detected, modifying at least one output signal of the processing unit that would cause propagation of the error through the system.

10 Claims, 3 Drawing Sheets

METHOD AND SYSTEM FOR FAULT CONTAINMENT

REFERENCE TO RELATED APPLICATION

This application is a continuation of U.S. application Ser. No. 13/417,382 filed on Mar. 12, 2012.

FIELD

The present invention relates generally to a method and system for fault containment in systems for multi-CPU or multi-core microcontrollers, and, in particular, to fault or error containment duplex systems for high integrity microcontrollers in automotive electronic control units (ECUs).

BACKGROUND

There is a trend that modern automotive ECUs integrate more and more functionality. On one side, this trend is driven by technology scaling that enables ever increasing levels of integration. Moreover, also the highly cost driven nature of the automotive industry forces developers to reduce the total number of ECUs per vehicle.

In this context, electronics plays an increasing role in providing advanced driving assistance functions that particularly help to prevent hazards and reduce the number of fatal injuries.

The integration of said assistance functions inside an ECU is mainly concentrated around a multi-CPU microcontroller that plays a decisive role by hosting the critical computation and control functions. Such a multi-CPU microcontroller may be regarded as a cluster of computation nodes with defined and encapsulated tasks.

Under such assumptions—i.e. that a plurality of critical computation and control functions related to various assistance functions are performed by the same multi-CPU microcontroller—failure isolation is a main concern to address in order to ensure that not all assistance functions are affected by a single error. This requirement influences all building blocks of the safety architecture for a system providing fault containment.

Consequently, embodiments aim at providing a new approach in safely managing errors in order to improve system availability.

SUMMARY

A method and system for fault containment is provided, substantially as shown in and/or described in connection with at least one of the figures, as set forth more completely in the claims.

Further features and advantages of embodiments will become apparent from the following detailed description made with reference to the accompanying drawings.

BRIEF DESCRIPTION OF THE DRAWINGS

The accompanying drawings are included to provide a further understanding and are incorporated in and constitute a part of this specification. The drawings relate to examples and embodiments and together with the description serve to explain the principles of the invention. Other embodiments and many of the intended advantages of embodiments will be readily appreciated as they become better understood by reference to the following detailed description.

DETAILED DESCRIPTION

Figure 1:
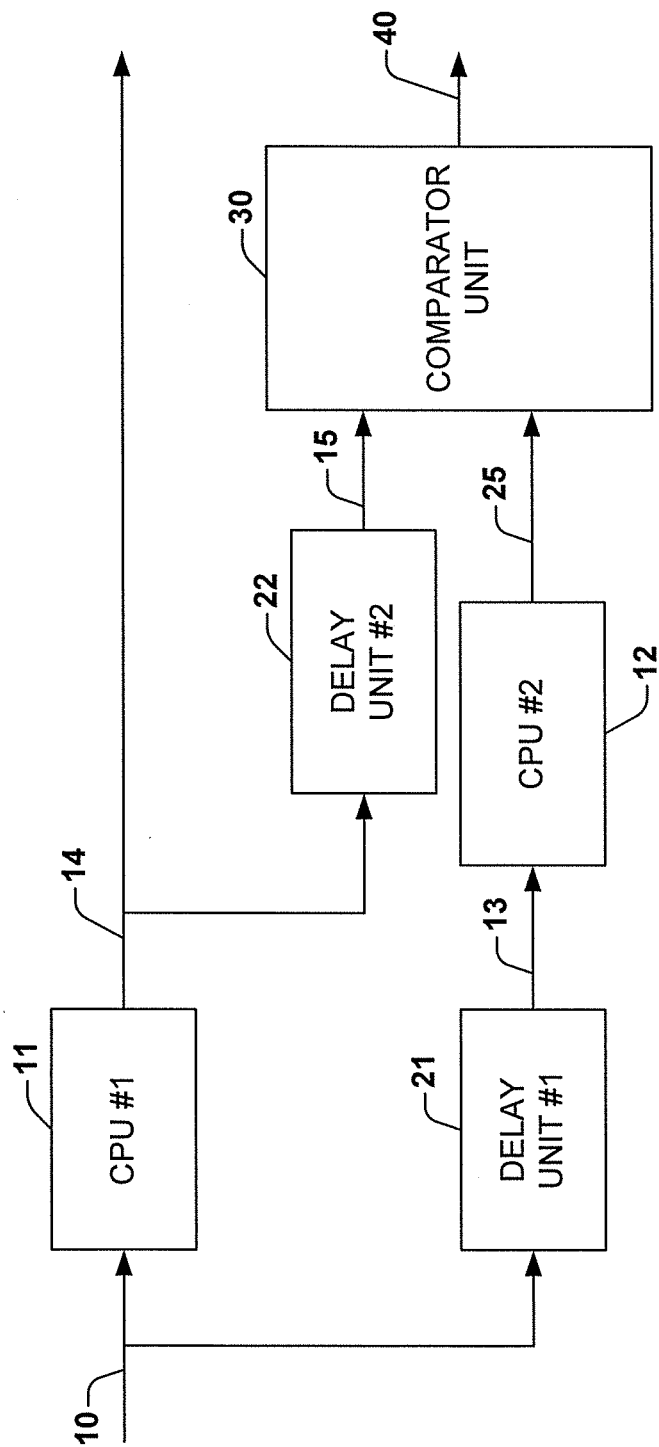
FIG. 1 shows a schematic signal flow diagram in a typical implementation of delayed lockstep CPUs.

In the following Detailed Description, reference is made to the accompanying drawings, which form a part hereof, and in which are shown by way of illustration specific embodiments. It is to be understood that other embodiments may be utilized and structural or other changes may be made without departing from the scope of the present invention. The following detailed description, therefore, is not to be taken in a limiting sense, and the scope of the present invention is defined by the appended claims.

One key issue regarding multi-CPU or multi-core microcontrollers is system availability. System availability means that if an error occurs in one of the CPUs the other CPUs should keep running their respective application.

This requirement has its parallels with regard to a trend in software architectures that define partitions so that a software error in one partition can be recovered by stopping and restarting this partition only, while the other partitions are isolated from the error.

For high integrity safety microcontrollers, the state of the art with regard to system integrity is to use duplex systems for a computation cluster, also known as lockstep execution of two CPUs. Lockstep execution of CPUs means that e.g. two CPUs execute the same process delayed by—for instance—two clock cycles to mitigate common cause failures.

Hence, in case of an error in a first lockstep CPU—in the above example—there is also at least a two clock cycle delay to detect the error. This is caused by the fact that the error is typically detected by comparison of a consequently two clock cycles delayed output of a second lockstep CPU with a delayed output of the first lockstep CPU. However, in the meantime until the error is detected, the error—if affecting a write transaction of the first lockstep CPU—may propagate into the rest of the microcontroller system such as an interconnect or a local SRAM.

Hence, embodiments relate to a prevention or containment of the above-mentioned error propagation—in short—to fault containment.

Nowadays, automotive ECUs are typically built in a way that a critical error always leads to entering a fail safe mode. However, in such situations, the process of entering the normal mode again is barely defined. In other words, error recovery is just in definition today.

Since the real complexity of the above-mentioned driving assistance functions is typically reflected in the complexity of the supporting software, there has been no focus in research and development so far on the corresponding microcontroller architecture and its ability to support said error recovery. Accordingly, no circuit is available today to allow to detect error propagation due to the above-mentioned phenomenon in a real application.

Therefore, embodiments comprise a system and method adapted to delay any output signal of a first CPU—such as typically a signal related to a write transaction of the first CPU—that might cause a propagation of an error while the error is detected.

As indicated before, this error detection is typically performed on the basis of delayed processing of the same input signal by at least one second CPU, such as in a delayed duplex system, and on the basis of a subsequent comparison of appropriate output signals of the first CPU and the at least one second CPU to generate a corresponding error signal.

In one embodiment, namely in the context of a duplex system based on a delayed lockstep CPU configuration of two lockstep CPUs, a write transaction of the first lockstep CPU that is ahead of a corresponding write transaction of the second lockstep CPU is delayed.

In an embodiment, this allows then to block the write transaction—for instance by an error blocking unit. Consequently, such error blocking may help to avoid corrupting any resource in the system by the write transaction that has been affected by the error before the error actually could be detected.

FIG. 1 shows a schematic signal flow diagram in a typical implementation of delayed lockstep CPUs. In this implementation example of previous delayed lockstep CPUs, an input signal 10—e.g. a processor command—is fed to a first CPU 11 and processed by the first CPU 11 to output a first output signal 14.

In parallel, the input signal 10 is also fed via a first delay unit 21 as a delayed input signal 13 to a second CPU 12 to output a second output signal 25. As mentioned before, the delayed lockstep configuration of the first CPU 11 and the second CPU 12 means that the first CPU 11 and the second CPU 12 operate in a fixed temporal relation with respect to each other. In a typical example, the second CPU 12 is operated by a clock signal, which has the same frequency as the clock signal of the first CPU 11 but is two clock cycles delayed with respect to the latter.

By delaying the processing of the input signal by the second CPU 12, the risk may be reduced that any common cause at a certain point in time affects the processing of the delayed input signal 13 by the second CPU 12 in the same way as the processing of the input signal 10 by the first CPU 11. Such common cause might be an electromagnetic interference (EMI) event, a short drop in the supply voltage for the CPUs or any other event that affects the correct processing of the input signal 10 by the first CPU 11.

In order to detect such an error in the processing by the first CPU 11, the second output signal 25 of the second CPU 12 is fed to a comparator unit 30 to be compared with a correspondingly delayed version of the first output signal 14, namely the delayed first output signal 15. In the example in FIG. 1, the first output signal 14 is delayed by a second delay unit 22 to yield the delayed first output signal 15.

In case no error occurred during the processing of the input signal 10 by the first CPU 11, the delayed first output signal 15 of the first CPU 11 will correspond to the second output signal 25 of the second CPU 12. As a result of the comparison of the delayed first output signal 15 with the second output signal 25, the comparator unit 30 will output an error signal 40 which indicates that no error has occurred.

However, in case an error occurred during the processing of the input signal 10 by the first CPU 11 or during the processing of the delayed input signal 13 by the second CPU 12, the delayed first output signal 15 of the first CPU 11 will most likely not correspond to the second output signal 25 of the second CPU 12. As a result of the comparison of the delayed first output signal 15 with the second output signal 25, the comparator unit 30 will then output an error signal 40 which indicates that an error actually has occurred.

Correspondingly, previous multi-CPU systems have been able to detect errors through delayed processing by one or more redundant CPUs and, hence, to avoid that the corrupted first output signal 14 is used after error detection. However, in the meantime, until the second output signal 25 is available and compared by the comparator unit 30, the corrupted first output signal 14 may propagate into subsequent stages of the system and corrupt any further processing after the detection of the error.

In a typical error case, the corrupted first output signal 14 may be related to a write transaction of the first CPU 11 such that the correspondingly corrupted write transaction may cause corruption of the target of this write transaction before the error is actually detected by the comparator unit 30.

Figure 2:
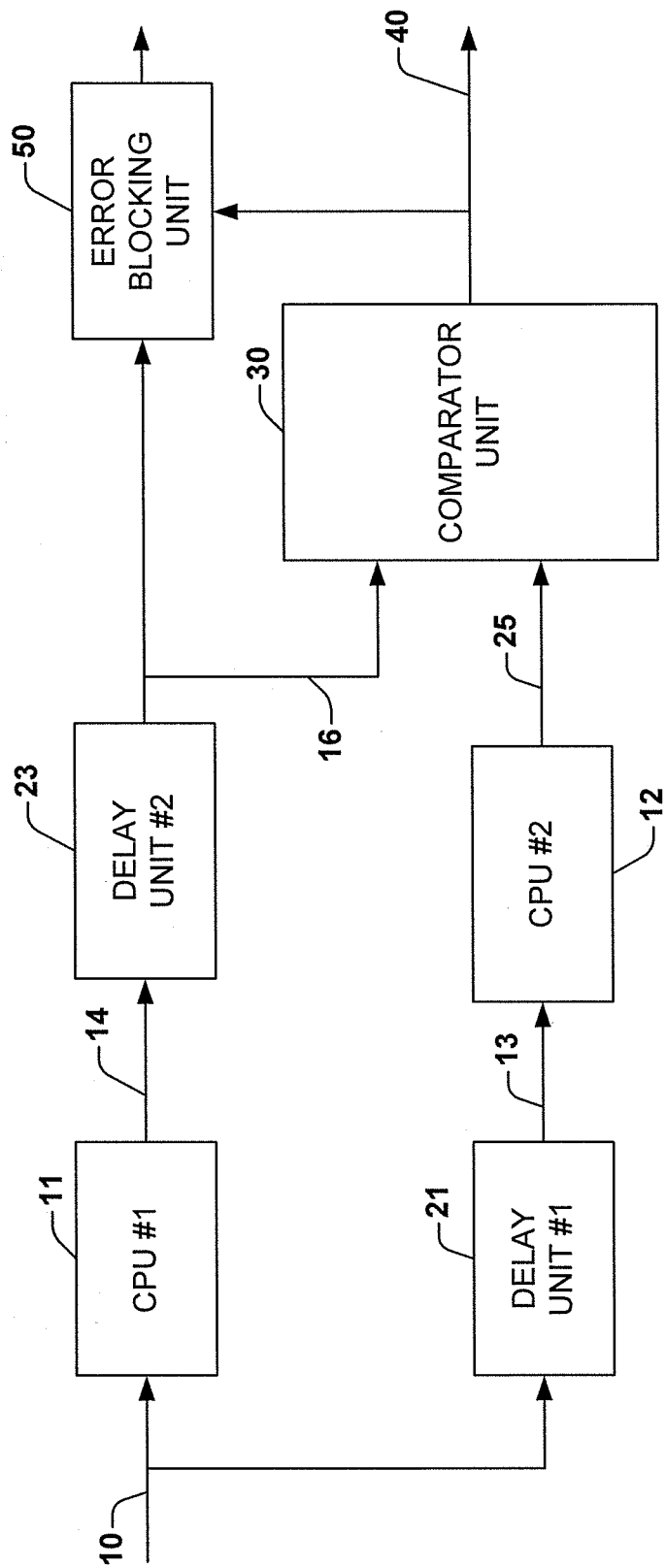
FIG. 2 shows a schematic signal flow diagram in an embodiment for corruption protected delayed lockstep CPUs.

In contrast to the above, FIG. 2 shows a schematic signal flow diagram in an embodiment for corruption protected delayed lockstep CPUs. In this embodiment—similar to the example in FIG. 1—the input signal 10 is fed to the first CPU 11 and processed by the first CPU 11 to output the first output signal 14.

Again, the input signal 10 is also fed in parallel via the first delay unit 21 as the delayed input signal 13 to the second CPU 12 to output the second output signal 25. Also similar to the example in FIG. 1, the second output signal 25 of the second CPU 12 is fed again to the comparator unit 30 to be compared with a correspondingly delayed version of the first output signal 14 in order to detect an error in the processing by the first CPU 11.

However, in the embodiment for corruption protected delayed lockstep CPUs of FIG. 2, a further second delay unit 23 delays the first output signal 14 to yield a further delayed first output signal 16 for the purpose of comparison of the further delayed first output signal 16 with the second output signal 25 by the comparator unit 30. The second delay unit 23 also applies a delay to the first output signal 14 for the purpose of delaying the first output signal 14 in general before it may be further processed by subsequent stages.

In this regard, the further second delay unit 23 may delay a first output signal 14 related to a write transaction. In this way, there is enough time for the comparator unit 30 to detect an error in the processing by the first CPU 11 by comparing the second output signal 25 of the second CPU 12 with the further delayed first output signal 16 of the first CPU 11 before the corrupted first output signal 14 related to a write transaction may propagate to further stages of the system and corrupt them too.

For this purpose, the system comprises an error blocking unit 50 adapted to receive the error signal 40 from the comparator unit 30. In one embodiment, the error signal 40 from the comparator unit 30 may be used to block the further delayed first output signal 16 of the first CPU 11 from propagating into the subsequent parts of the system. As a result, in this case of an error in a write transaction, the integrity of the system may be maintained.

In other words, embodiments may enable delaying write transactions to totally block them or to provide enough time to abort them. This may help multi-core systems to avoid corruption or to restrain it to known memory ranges so that part of the system can keep running.

In the following, some implementation variants to the embodiment in FIG. 2 are described. For instance, the further second delay unit 23 may be implemented in many different ways. In one embodiment, the further second delay unit 23 may delay all signals from the first CPU 11. In another embodiment, the further second delay unit 23 may delay only signals related to write transactions. In a further embodiment, the further second delay unit 23 may delay only signals related to a category of write transactions. For instance, in one embodiment, the further second delay unit 23 may delay signals related to write transactions to peripherals and memory attached to a shared internal bus and not delay signals related to write transactions to tightly coupled memories.

Also the error blocking unit 50 may be implemented in many different ways. In one embodiment, the error blocking unit 50 may actually block a write transaction originating from the first CPU 11 from further propagating through the system.

In another embodiment, the error blocking unit 50 may let a write transaction pass onto the system bus but then send a command to abort the write transaction as soon as an error is detected.

In a further embodiment, the error blocking unit 50 may be adapted to modify the address of the write transaction to point to a reserved location or to a "safe" location reserved for that purpose.

In a still further embodiment, the write transaction may be protected by error detection/correction codes. In this case, the error blocking unit 50 may be adapted to corrupt the address signature of the write transaction which leads to an error at the target of the write transaction and which—ultimately—aborts the write transaction.

Figure 3:
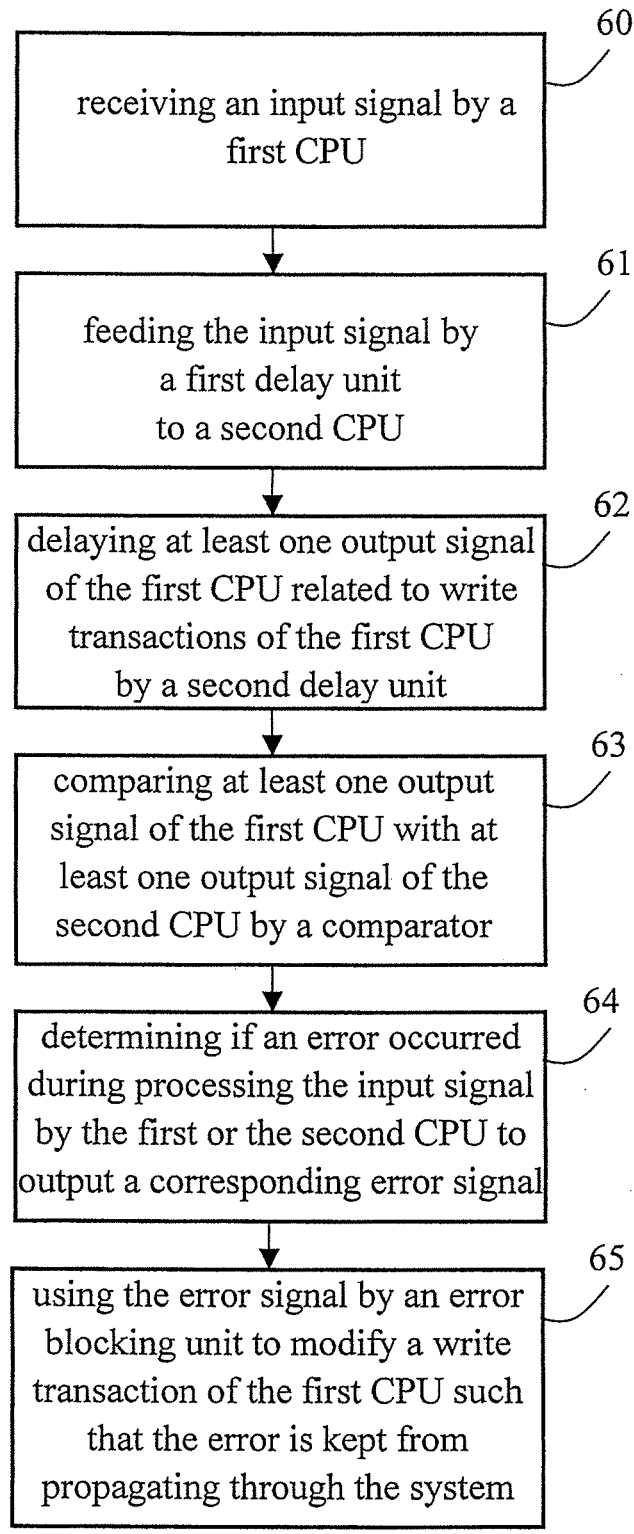
FIG. 3 shows an embodiment of a method for avoiding error propagation in a multi-CPU system.

FIG. 3 shows an embodiment of a method for avoiding error propagation in a multi-CPU system. In step 60 of the method, an input signal is received by a first CPU.

In step 61 of the method, the input signal is fed by a first delay unit to a second CPU. In step 62 of the method, at least one output signal of the first CPU related to write transactions of the first CPU is delayed by a second delay unit.

Moreover, in step 63 of the method as shown in FIG. 3, at least one output signal of the first CPU that was delayed by the second delay unit is compared by a comparator with at least one output signal of the second CPU.

In step 64 of the method, as a result of the above comparison, it is determined if an error occurred during processing the input signal by the first or the second CPU to output a corresponding error signal.

In a further step 65 of the method as shown in FIG. 3, the error signal is used by an error blocking unit to modify a write transaction of the first CPU such that the error is kept from propagating through the system.

With respect to the above-described embodiments which relate to the Figures, it is emphasized that said embodiments basically served to increase the comprehensibility. In addition to that, the following further embodiments try to illustrate a more general concept. However, also the following embodiments are not to be taken in a limiting sense. Rather—as expressed before—the scope of the present invention is defined by the appended claims.

In this regard, a first embodiment relates to a system for avoiding error propagation in a multi-CPU system comprising a first CPU and at least one second CPU. In this system, the at least one second CPU is adapted to operate in delayed lockstep configuration with the first CPU to detect an error by comparing at least one output signal from the first CPU with at least one output signal from the at least one second CPU.

Furthermore, this system comprises at least one delay unit adapted to delay at least one output signal of the first CPU related to a write transaction of the first CPU to modify at least one write transaction of the first CPU such that the error is kept from propagating through the system.

In one embodiment, the at least one delay unit is adapted to delay all output signals of the first CPU.

In another embodiment, the at least one delay unit is adapted to delay all output signals of the first CPU related to a write transaction of the first CPU.

In still one further embodiment, the at least one delay unit is adapted to delay at least one output signal of the first CPU related to a predetermined category of write transactions of the first CPU.

According to a further embodiment, the at least one delay unit is adapted to delay at least one output signal of the first CPU related to write transactions of the first CPU to peripherals and memory attached to a shared internal bus of the first CPU and the at least one second CPU.

A further embodiment relates to a system comprising a first CPU coupled to receive an input signal, a second CPU and a first delay unit coupled to feed the input signal to the second CPU.

In this system, a second delay unit is coupled to delay at least one output signal of the first CPU related to write transactions of the first CPU. Moreover, said system comprises a comparator unit coupled to compare at least one output signal of the first CPU that is delayed by the second delay unit with at least one output signal of the second CPU to determine if an error occurred during processing the input signal by the first CPU or the second CPU, and output a corresponding error signal.

Furthermore, said system comprises a protected error blocking unit coupled to use the error signal to modify—under a protection condition—a write transaction of the first CPU such that the error is kept from propagating through the system.

In an embodiment, the error blocking unit is protected in that the system further comprises a further comparator unit coupled to compare the at least one output signal of the first CPU that is delayed by the second delay unit with the at least one output signal of the second CPU. The purpose of the further comparator unit is to redundantly determine if an error occurred during processing the input signal by the first CPU or the second CPU, and output a corresponding negated error signal.

Moreover, the above system comprises a third comparator unit coupled to verify said protection condition that the error signal and the negated error signal correspondingly agree.

In embodiments, the protection of the error blocking unit may help to provide a system that is fully compliant with the ISO26262 standard. Specifically, the protection may help to detect and avoid any dangerous situations where the error blocking unit might perform an "unintended" blocking in the absence of a lockstep error.

In one embodiment, the protected error blocking unit is adapted to block the write transaction of the first CPU from being executed.

In another embodiment, the protected error blocking unit is adapted to cause aborting the write transaction of the first CPU as soon as the error is determined.

In still one further embodiment, the protected error blocking unit is adapted to modify a write transaction address of the write transaction to point to a location reserved for fault containment.

According to another embodiment, the protected error blocking unit is adapted to corrupt an address signature of the write transaction if the write transaction is protected by error detection/correction codes leading to an error at the target of the write transaction, and the target of the write transaction aborting the write transaction.

A still further embodiment relates to a system comprising a processing unit and at least one further processing unit. In this system the at least one further processing unit is adapted to process an input signal with a predetermined delay with respect to the processing unit to detect a processing error by comparison of predetermined output signals of the processing unit and the at least one further processing unit.

Moreover, this system comprises at least one delay unit adapted to delay at least one output signal of the processing unit to avoid unmodified propagation of at least one output signal of the processing unit through the system if a processing error has been detected.

In an embodiment, the at least one delay unit is adapted to delay at least one output signal of the processing unit related to a write transaction of the processing unit to modify at least one write transaction of the processing unit such that the processing error is kept from propagating through the system.

In another embodiment, the system further comprises a protected error blocking unit coupled to use the result of said comparison of the predetermined output signals of the processing unit and the at least one further processing unit to modify—under a protection condition—a write transaction of the processing unit such that the processing error is kept from propagating through the system.

In one embodiment, the error blocking unit is protected in that the system further comprises means to perform a redundant comparison of the predetermined output signals of the processing unit and the at least one further processing unit to redundantly detect if a processing error occurred during processing the input signal by the processing unit or the at least one further processing unit.

Furthermore, this embodiment comprises means to verify said protection condition that said comparison and said redundant comparison correspondingly agree.

In one embodiment, a delay provided by the at least one delay unit is long enough to enable aborting at least one write transaction of the processing unit.

A further embodiment relates to a method for avoiding error propagation in a multi-CPU system with a first CPU and at least a second CPU. In one step of this method, at least one second CPU is operated in delayed lockstep configuration with the first CPU to detect an error in form of at least one different processing result.

In a further step of the above method, at least one output signal of the first CPU related to a write transaction of the first CPU is delayed to modify at least one write transaction of the first CPU such that the error is kept from propagating through the system.

In one embodiment, delaying comprises delaying all output signals of the first CPU.

In another embodiment, delaying comprises delaying all output signals of the first CPU related to a write transaction of the first CPU.

In a further embodiment, delaying comprises delaying at least one output signal of the first CPU related to a predetermined category of write transactions of the first CPU.

In a still further embodiment, delaying comprises delaying at least one output signal of the first CPU related to write transactions of the first CPU to peripherals and memory attached to a shared internal bus of the first CPU and the at least one second CPU.

A further embodiment relates to a method for error containment in a system. This method comprises the step of processing an input signal by a processing unit and at least one further processing unit to detect an error in form of at least one different processing result. In a further step of this method, at least one output signal of the processing unit is delayed to enable—in case an error has been detected—modifying at least one output signal of the processing unit that would cause propagation of the error through the system.

In an embodiment, delaying comprises delaying at least one output signal of the processing unit related to a write transaction of the processing unit to modify at least one write transaction of the processing unit by an error block unit such that the detected error is kept from propagating through the system.

In one embodiment, modifying the at least one write transaction of the processing unit comprises blocking the write transaction of the first CPU from being executed.

In another embodiment, modifying the at least one write transaction of the processing unit comprises causing the write transaction of the first CPU to abort as soon as the error is detected.

In a still further embodiment, modifying the at least one write transaction of the processing unit comprises modifying at least one write transaction address of the at least one write transaction to point to a location reserved for fault containment.

A further embodiment relates to a method for error containment in a system comprising a step of detecting an error by processing an input signal by multiple processing units. In a further step, at least one output signal of a processing unit is delayed to enable—in case an error has been detected—modifying at least one output signal of the processing unit that would cause propagation of the error through the system.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system in a multi-central processing unit (CPU) system, comprising:
    a first CPU;
    at least one second CPU, wherein the at least one second CPU is configured to operate in delayed lockstep configuration with the first CPU;
    a delay unit configured to expose at least one output signal from the first CPU to a delay;
    a comparator configured to detect an error by comparing the at least one output signal from the first CPU delayed by the delay unit with at least one output signal from the at least one second CPU; and
    an error blocking unit coupled to the delay unit and the comparator,
    wherein the error blocking unit receives the at least one output signal delayed by the delay unit and an error signal from the comparator having a state indicative of whether an error was detected by the comparator in the processing of the at least one output signal in the first CPU, and
    wherein the error blocking unit is configured to block or modify a propagation of the at least one output signal from the first CPU if the error signal indicates an error.

2. The system of claim 1, wherein the at least one output signal from the first CPU is related to a write transaction of the first CPU.

3. The system of claim 2, wherein the error blocking unit is configured to modify the at least one write transaction of the first CPU such that the error is kept from propagating through the system.

4. The system of claim 1, wherein the delay unit is configured to delay all output signals of the first CPU.

5. The system of claim 1, wherein the delay unit is configured to delay all output signals of the first CPU related to a write transaction of the first CPU.

6. The system of claim 1, wherein the delay unit is configured to delay at least one output signal of the first CPU related to a predetermined category of write transactions of the first CPU.

7. The system of claim 1, wherein the delay unit is configured to delay at least one output signal of the first CPU related to write transactions of the first CPU to peripherals and memory attached to a shared internal bus of the first CPU and the at least one second CPU.

8. A system, comprising:
- a first CPU configured to receive an input signal and generate at least one output signal based thereon;
- a second CPU;
- a first delay unit configured to receive the input signal, delay the input signal, and feed the delayed input signal to the second CPU;
- a second delay unit configured to delay the at least one output signal of the first CPU to form a delayed output signal;
- wherein the second CPU outputs another delayed output signal due to the delay of the first delay unit;
- a comparator unit configured to compare the delayed output signal of the first CPU with the another delayed output signal of the second CPU to detect if an error occurred during processing the input signal by the first CPU,
- wherein the comparator unit is further configured to output an error signal, based on the detection;
- a protected error blocking unit configured to use the error signal to modify, under a protection condition when the error signal indicates an error has occurred, a write transaction of the first CPU such that the error is kept from propagating through the system.

9. The system of claim 8, wherein the at least one output signal is related to write transactions of the first CPU.

10. A method for error containment in a system comprising:
- processing an input signal by a first processing unit and at least one second processing unit;
- delaying at least one output signal of the first processing unit;
- comparing the at least one output signal of the first processing unit with an output signal of the at least one second processing unit using a comparison circuit, and generating an error signal based on a comparison result, wherein the error signal is indicative of whether an error was detected by the comparison circuit; and
- selectively blocking or modifying a propagation of the at least one output signal of the first processing unit based on the error signal using an error blocking unit.

* * * * *